(12) United States Patent
Gindele et al.

(10) Patent No.: US 8,077,948 B2
(45) Date of Patent: Dec. 13, 2011

(54) METHOD FOR EDITING 3D IMAGE SEGMENTATION MAPS

(75) Inventors: Edward B. Gindele, Rochester, NY (US); Lawrence A. Ray, Rochester, NY (US); Richard A. Simon, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 490 days.

(21) Appl. No.: 12/341,022

(22) Filed: Dec. 22, 2008

(65) Prior Publication Data

US 2009/0279756 A1 Nov. 12, 2009

Related U.S. Application Data

(60) Provisional application No. 61/050,736, filed on May 6, 2008.

(51) Int. Cl.
*G06K 9/00* (2006.01)
(52) U.S. Cl. ......................... 382/128; 382/131
(58) Field of Classification Search .................. 382/128, 382/131; 128/920, 922
See application file for complete search history.

(56) References Cited

U.S. PATENT DOCUMENTS

| | | | |
|---|---|---|---|
| 6,542,153 B1 | 4/2003 | Liu et al. | |
| 7,194,117 B2 * | 3/2007 | Kaufman et al. | 382/128 |
| 2005/0286750 A1 | 12/2005 | Dehmeshki | |
| 2006/0269109 A1 | 11/2006 | Okada et al. | |

OTHER PUBLICATIONS

Cohen et al.: "*Global Minimum for Active Contour Models: A Minimal Path Approach*," International Journal of Computer Vision, vol. 24, No. 1, pp. 57-78, Aug. 1997.
Sun et al.: "*Computation of Minimum-Volume Covering Ellipsoids*," Operations Research, vol. 52, No. 5, pp. 690-706, Sep.-Oct. 2004.
Commonly assigned application U.S. Appl. No. 61/050,752, entitled "Method for Interactively Determining a Bounding Surface for Segmenting a Lesion in a Medical Image", provisionally filed on May 6, 2008.
Commonly assigned application U.S. Appl. No. 61/050,723, entitled "Statistics Collection for Lesion Segmentation", provisionally filed on May 6, 2008.
Reeves, A.P. et al., "On Measuring the Change in Size of Pulmonary Nodules," IEEE Transactions on Medical Imaging, vol. 25, No. 4, Apr. 2006, pp. 435-450, XP001545783.
European Search Report dated Jan. 27, 2011, from the European Patent Office re: Application No. 09 005 602.9, 2 pages.
Takeo Igarashi, et al., "Teddy: A Sketching Interface for 3D Freeform Design," SIGGRAPH '99: Proceedings for the 26th annual conference on Computer graphics and interactive techniques (1999), pp. 409-416.

* cited by examiner

*Primary Examiner* — David Mis

(57) ABSTRACT

A digital image editing method includes receiving a three-dimensional volume image of an anatomical object of interest, wherein the volume image is characterized by first and second mutually exclusive segmentation classes. The method also includes deriving a two-dimensional slice image from the volume image, selecting a single point on the slice image within the second segmentation class, and defining a plane in response to the selection of the single point, the plane dividing the second segmentation class into a target portion corresponding to the object and a remainder portion.

20 Claims, 6 Drawing Sheets

METHOD FOR EDITING 3D IMAGE SEGMENTATION MAPS

CROSS REFERENCE TO RELATED APPLICATIONS

Priority is claimed from U.S. Ser. No. 61/050,736, provisionally filed on May 6, 2008, entitled "METHOD FOR EDITING 3D IMAGE SEGMENTATION MAPS", in the name of Edward B. Gindele et al., commonly assigned and incorporated herein by reference.

FIELD OF THE INVENTION

The present invention relates to the field of digital imaging, and more particularly to digital editing methods.

BACKGROUND OF THE INVENTION

Image segmentation is a branch of digital image processing that performs the task of categorizing, or classifying, the elements of a digital image into one or more class types. For medical imaging applications, it is common that image segmentation is performed on the voxel (volume element) of a 3-dimensional image data set with the classification types related to anatomical structure. In thoracic medical images, it is convenient to segment the image voxels into classes such as bone, lung parenchyma, soft tissue, bronchial vessels, blood vessels, etc. There are many reasons to perform such a task, such as surgical planning, treatment progress, and patient diagnosis.

Of interest is the image segmentation technology that allows a user of a Picture Archiving and Communications System (PACS) to segment a suspected cancerous pulmonary lesion. Starting with a seed point, i.e., a voxel position that is known to be part of a lesion, a region of contiguous voxels is grown, or developed, about the seed point. For such lesion segmentation algorithms, the only voxel value know for certainty that is characteristic of the lesion to be segmented is the seed point voxel. Thus, the statistical properties of the voxels associated with lesion to be segmented, such as the mean voxel value and the range of voxel values, must either be assumed a priori from experience or approximated.

Pulmonary lesions often grow adjacent to vessels (arteries, veins, or airways). The morphology of vessels and pulmonary lesions can be similar. Further complicating the geometry is the fact that cancerous and benign lesions can grow fully around a vessel. As a consequence, image segmentation algorithms often misclassify voxels in the vicinity of the junction between lesion and vessel tissue. The misclassification of voxels can also be the result of the uncertainties in the underlying statistics regarding the both the lesion and vessel tissues.

The results of three dimensional (3D) image segmentation processing is typically visualized with a computer graphics 3D routine that shows the set of segmented voxels (segmentation map) as a 3D object from a single point perspective shaded by a light source. This is usually accomplished by calculating a mesh model of connected points corresponding to voxels that are on the surface, or exterior, of the segmentation map. Alternatively, the volume rendering techniques can also be used to visualize the 3-dimensionality of the segmentation map.

Interactive 3D editing tools have been developed for the computer graphics industry and the medical imaging industry. U.S. Pat. No. 6,542,153 to Liu et al. discloses a method for constructing clipping planes used to modify segmented voxel image data by projecting vertices of a region of interest (ROI) in one plane and transforming the data within the ROI to allow all of a plurality of slices on the inside of the ROI to be along one axis of a three axis coordinate system. The method disclosed by Liu requires representing the inside of the ROI as a plurality of line segments, wherein only two coordinates and the length of a line segment are stored. The system is computationally intensive and complex for use in modifying the segmentation maps for pulmonary lesions.

The segmentation map resulting from the image segmentation processing is also viewed in the form of sequential slices. Undesirable structures of segmentation maps are most reliably removed using prior art manual editing methods. These methods typically have the user of the PACS manually draw outlines of the structures to be removed on every image slice of the segmentation map using careful hand-directed cursor manipulations. A disadvantage of such methods is that manual editing is a very repetitive, tedious, and time consuming process. When the number of image slices to be edited is large, as in a typical study to be 3D reconstructed using CT imaging, manual editing consumes expensive machine and operator time, notwithstanding that the operator is an expert.

Interactive 3D editing tools (such as 3D-Doctor found at www.3d-doctor.com) have also been developed for modifying medical images. Such tools allow the user to modify a segmentation map in a "cut mode." The user clicks and drags with the mouse to form a cut line and then uses a parameter dialog box to determine how many slices of the segmentation map will be affected by the cut line. Although precise control can be exercised with such a tool, there are many manual operations that need to be performed to achieve an arbitrary planar cut.

Thus, a need exists for an interactive 3D editor that requires very little input to modify segmentation maps for pulmonary lesions.

SUMMARY OF THE INVENTION

In an exemplary embodiment of the present disclosure, a digital image editing method includes receiving a three-dimensional volume image of an anatomical object of interest, wherein the volume image is characterized by first and second mutually exclusive segmentation classes. The method also includes deriving a two-dimensional slice image from the volume image, selecting a single point on the slice image within the second segmentation class, and defining a plane in response to the selection of the single point, the plane dividing the second segmentation class into a target portion corresponding to the object and a remainder portion. In such an embodiment, the first segmentation class corresponds to at least one of a parenchyma, a vessel, and a chest wall, and the second segmentation class corresponds to a lesion. In addition, the target portion corresponds to a lesion, and the remainder portion corresponds to at least one of a parenchyma, a vessel, and a chest wall. In such a method, the single point lies within the plane. Such a method further includes creating a three-dimensional rendering of the target and remainder portions connected at the first plane. The method also includes rendering the remainder portion transparent such that only the target portion is displayed in the three-dimensional rendering. Such a method also includes defining an additional plane in response to the selection of the single point, wherein the plane and the additional plane each define a cross section of the object thereon. Such a method further includes calculating a characteristic of each of the defined cross sections, and choosing one of the plane and the additional plane based on the calculated characteristics. In such a method, choosing one of the plane and the additional plane includes selecting a plane that defines a minimum cross sectional area of a contiguous portion of the object and that passes through the single point. In such a method, the calculated characteristic is an area of the defined cross section.

In another exemplary embodiment of the present disclosure, a digital image editing method, includes viewing a two-dimensional slice image of an anatomical object of interest corresponding to a three-dimensional volume image of the object, wherein the volume image is characterized by first and second mutually exclusive segmentation classes, selecting a single point on the slice image within the second segmentation class, and forming a plurality of planes in response to the selection of the single point, each plane of the plurality of planes passing through the single point and defining a cross section of the object thereon. Such a method also includes calculating a characteristic of each cross section defined by the plurality of planes, selecting a plane of the plurality of planes based on the calculated characteristics, and classifying the second segmentation class along the selected plane. In such an exemplary method, calculating a characteristic of each cross section includes calculating an area of a contiguous portion of each cross section defined by the plurality of planes. In such an exemplary method, selecting a plane of the plurality of planes includes selecting a plane defining a minimum cross sectional area of a contiguous portion of the object. Additionally, in such a method, the first segmentation class corresponds to at least one of a parenchyma, a vessel, and a chest wall, and the second segmentation class corresponds to a lesion. Such a method further includes forming a three-dimensional rendering of the object including a target portion and a remainder portion connected by the selected plane. The method also includes rendering the remainder portion transparent such that only the target portion is displayed in the three-dimensional rendering.

In a further exemplary embodiment of the present disclosure, a digital editing method includes receiving a three-dimensional volume image of an anatomical object of interest, wherein the volume image is characterized by first and second mutually exclusive segmentation classes, deriving a three-dimensional view from the volume image, selecting a single point on the three-dimensional view within the second segmentation class, and defining a plane in response to the selection of the single point, the plane dividing the second segmentation class into a target portion corresponding to the object and a remainder portion. In such an exemplary method, the first segmentation class corresponds to a parenchyma and the second segmentation class corresponds to a lesion connected to one of a vessel and a chest wall. Such a method also includes identifying an additional point on the three-dimensional view, the single point and the additional point both being disposed on the plane. Additionally, in such a method the additional point lies along a line of sight vector passing through the single point.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Reference is made to commonly assigned application U.S. Ser. No. 61/050,752, entitled "METHOD FOR INTERACTIVELY DETERMINING A BOUNDING SURFACE FOR SEGMENTING A LESION IN A MEDICAL IMAGE", provisionally filed on May 6, 2008, the entire disclosure of which is incorporated herein by reference.

Reference is also made to commonly assigned application U.S. Ser. No. 61/050,723, entitled "STATISTICS COLLECTION FOR LESION SEGMENTATION", provisionally filed on May 6, 2008, the entire disclosure of which is incorporated herein by reference.

Many medical imaging applications are implemented via a PACS. These systems provide a way for displaying digital images acquired by a wide variety of medical imaging modalities such as, but not limited to, projection radiography (x-ray images), computed tomography (CT images), ultrasound (US images), and magnetic resonance (MR images). Each of the above mentioned medical imaging modalities contain slightly different diagnostic information. In particular, CT and MR images, when viewed and studied by a radiologist, can reveal much detail about a patient's 3-dimensional internal anatomy. Computer algorithm technology can also be applied to medical images to enhance the rendering of the diagnostic information, to detect an abnormal condition, i.e., computer aided detection (CAD), and to make measurements relating to the patient's condition, i.e., computer aided measurement (CAM).

Exemplary methods of the present disclosure may employ a computer algorithm segmenting a portion of a medical image with anatomical relevance. In an exemplary embodiment, the methods described herein may be used for the segmentation of abnormal pulmonary lesion tissue from normal tissue. In such an embodiment, a user of the PACS system, usually a radiologist, may review thoracic CT exam on a medical PACS and may indicate to the CAM segmentation software the position and orientation of a suspected pulmonary lesion. Typically, the user supplies two point locations associated with the suspected lesion while viewing an axial slice of the CT exam. Optionally, the user can supply more than two points within the exam. The voxel positions indicated by the user can be located near, but not necessarily exactly on or within, the boundary of the pulmonary lesion. Alternatively, the user can supply two points, one or both of which are wholly within the lesion tissue region. The CAM segmentation software embodying the technology of the present disclosure may then identify voxels that are part of the pulmonary lesion, i.e. a segmentation of the lesion tissue is performed. Once the region associated with the pulmonary lesion has been segmented features of the lesion can be quantified analytically such as the corresponding volumetric size.

Although exemplary embodiments of the present disclosure may be described as a software program, those skilled in the art will readily recognize that the equivalent of such software can also be constructed in hardware.

Figure 1:
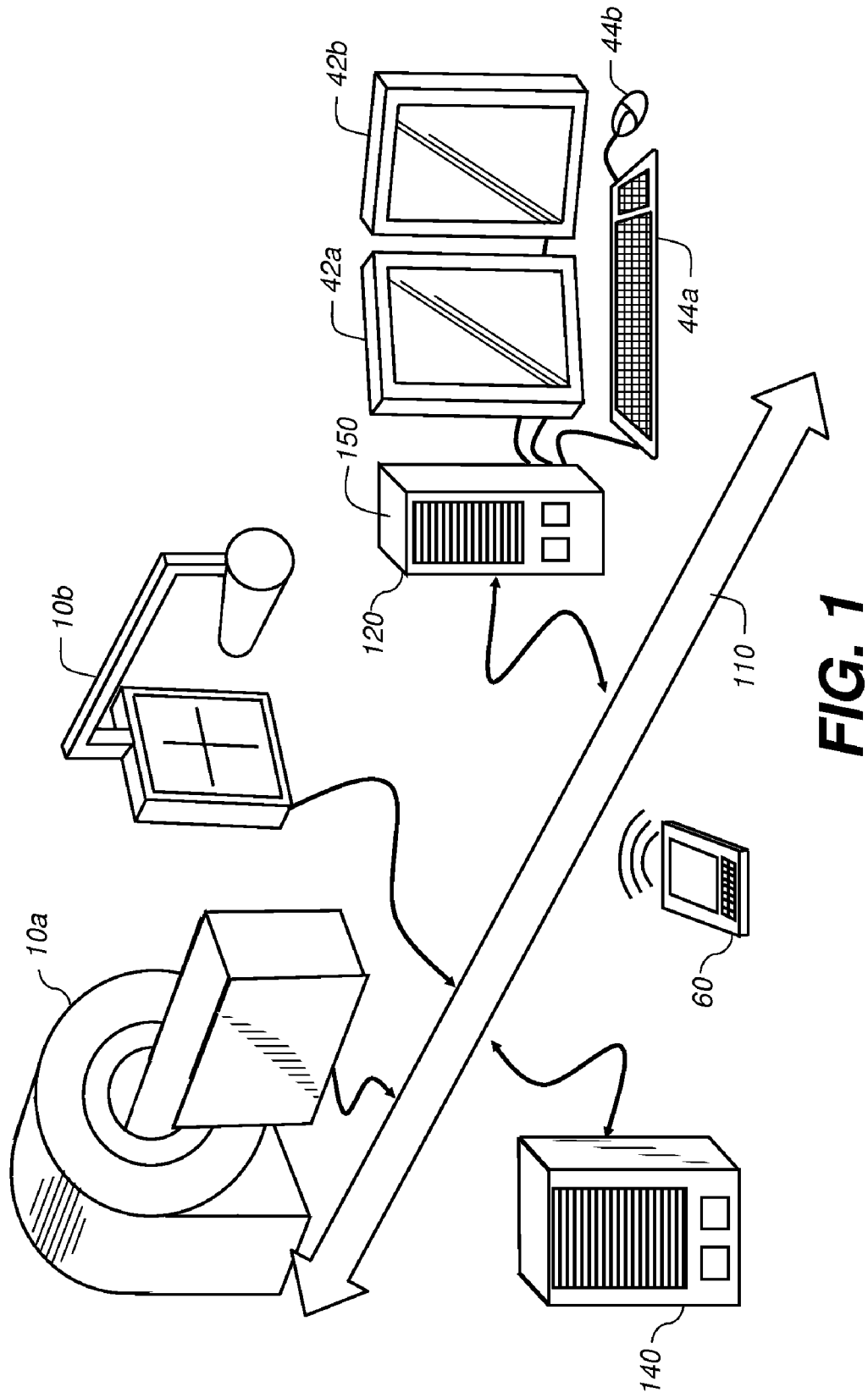
FIG. 1 is a diagram showing a medical imaging communications network of connected computers suitable for practicing embodiments of the present disclosure.

FIG. 1 shows a medical imaging communications network that includes multiple connected computers. Such a network of computers provides a way of sending and receiving information between any two or more connected computers. An image capture device generates medical digital images of a patient (not shown). An image capture device 10a symbolically represents a number of medical digital image modality devices such as, but not limited to, a computed tomography scanning device (CT) or Magnetic Resonance imaging scanning device (MR) that are capable of producing 3-dimensional digital images of patient anatomy.

A patient may be positioned on a movable table within the capture device assembly such that the patient can be moved relative to the signal source of the capture device. The capture device receives the signals that have passed through the patient in raw form, processes these signals, and produces a slice digital image. Each slice digital image represents a cross sectional, or slice, through the patient anatomy. Repositioning the patient relative to the source signal and acquiring other slice digital images can generate a slice image series. Typically this is done by placing the patient on a bed that moves relative to the imaging apparatus. A slice image series, assembled in proper order, can represent the full 3-dimensional volume of an imaged patient.

Also connected to a communications network 110 is a digital radiographic (DR) capture device 10b capable of producing digital x-ray images. As such, the images produced by a DR capture device typically are one or more 2-dimensional digital images each representing a different exposure and/or imaging path through the patient. For example, the DR capture device 10b can be used to acquire multiple projection radiographic digital images with its x-ray source located in different positions relative to the patient. The resulting DR radiographic digital images can be processed to produce a set of tomosynthesis slice digital images that represent a 3-dimensional digital image of the patient.

The slice digital images (not shown) produced by the capture device 10a are transmitted via the communications network 110 to an image archive computer 140 where, along with patient history information, they become part of an electronic patient history record. A function performed by the image archive computer 140 is the facilitation of transfer or exchange of image information rather than the processing of information. The image archive computer 140 serves as a large storage repository of digital images and other, but unspecified, medical information. The arrows in the diagram of FIG. 1 represent the exchange of information, which in general, is bi-directional i.e.; the flow of information can be in either direction.

The slice images are later queried on a diagnostic workstation computer 120, sometimes referred to as a PACS, for viewing and examination by a radiologist or similarly trained medical professional. The diagnostic workstation computer 120 can have multiple electronic displays connected for viewing medical images. Two such electronic display devices 42a and 42b are shown in FIG. 1. Also connected to the diagnostic workstation computer 120 are input devices 44a and 44b depicted here as keyboard and mouse devices, respectively. Although embodiments of the present disclosure may be operable within the context of a diagnostic workstation computer, it should be noted that any computing device capable of displaying and processing image data might be used. For example, a mobile computer 60 shown in FIG. 1 can be used with the present invention. Thus, it is not necessary for the computer to be physically connected to the communications network 110.

A PACS can be defined as a system that acquires, transmits, stores, retrieves, and displays digital images and related patient information from a variety of imaging sources and communicates the information over a network. By this definition, the diagnostic workstation computer 120 shown in FIG. 1 can represent a PACS. Similarly, the combination of the diagnostic workstation computer 120, mobile computer 60, image archive computer 140, and communication network 110 can collectively be considered a PACS. In addition to the patient digital images, PACS transmit, receive, and store other electronic patient record information such as, but is not limited to, non-image information (meta-data) such as age, sex, medical history, prescribed medications, symptoms, etc.

For the purposes of this disclosure, the collection of interconnected computers including the communications network will be also be referred to as a "DICOM" network since DICOM (Digital Imaging and Communications in Medicine PS 3.3-1999, National Electrical Manufacturers Association, 1999) formatted digital images are currently is the industry standard and the most prevalent file encoding used for medical digital images. Typically, a 3-dimensional volume image is constructed from a set of 2-dimensional slice digital images wherein each slice digital image is encoded as an individual DICOM file.

Often an individual digital image data element, i.e., single value representing measured image signal intensity, is referred to as a "voxel" for 3-dimensional images and a "pixel" for 2-dimensional images. The term voxel is commonly used to characterize a volume-element whereas the term pixel is commonly used to characterize a picture-element. Exemplary embodiments of the present disclosure can be applied to 2-dimensional and 3-dimensional images. As such, for the purposes of the description herein, the terms voxel and pixel should be considered interchangeable, i.e., describing an image elemental datum capable of having a range of numerical values. Voxel and pixels can be said to have the attributes both of location and value.

With the medical imaging system setup as described above and shown in FIG. 1, a medical professional, such as a radiologist, uses the keyboard 44a or mouse 44b to indicate to a software application program 150, running on the diagnostic workstation computer 120, the desired patient record to be loaded into memory. The CT digital image exam, i.e., the set of CT slice digital images, is then retrieved from the image archive computer 140 and displayed on the electronic display devices 42a and 42b. After viewing the image data, the medical professional indicates to the system the location of a suspected pulmonary lesion with a click of the mouse, input device 44b. Typically, this is performed by sequentially scrolling through the 2-dimensional slices digital images and selecting the slice digital image that best shows the suspected pulmonary lesion.

Embodiments of the present disclosure may be used for the purpose of collecting statistical information regarding an anatomical region or object of interest, such as lesion tissue, i.e., localized abnormal tissue regions. However, any localized anatomical region or object of interest within a set of medical diagnostic digital images can serve as the focus region of the collection of statistical information. For example, an anatomical region or object of interest could be an entire organ such as the liver.

Embodiments of the present disclosure may be used in conjunction with automatic segmentation algorithms. Given that any automatic segmentation algorithm will make misclassification judgments with regard to normal and abnormal tissue, there is a need for a fast recovery tool that a trained observer can quickly repair a segmentation map. A typical use case scenario would include a radiologist using a PACS to review patient CT cases. Automatic segmentation of pulmonary lesions is initiated either by running a computer aided detection (CAD) algorithm that automatically finds lesions or by the operator viewing the image data and manually selecting a lesion to segment. In either scenario, a segmentation map results from the automatic segmentation algorithm. A segmentation map is essentially a classification label given to each voxel in the map as to the identified tissue type. Each location in the segmentation map corresponds to a location in the original image voxel data set. For exemplary pulmonary lesion segmentation algorithms, the types of tissue that can be classified include; lesion, vessel, parenchyma, and chest wall.

Figure 2:
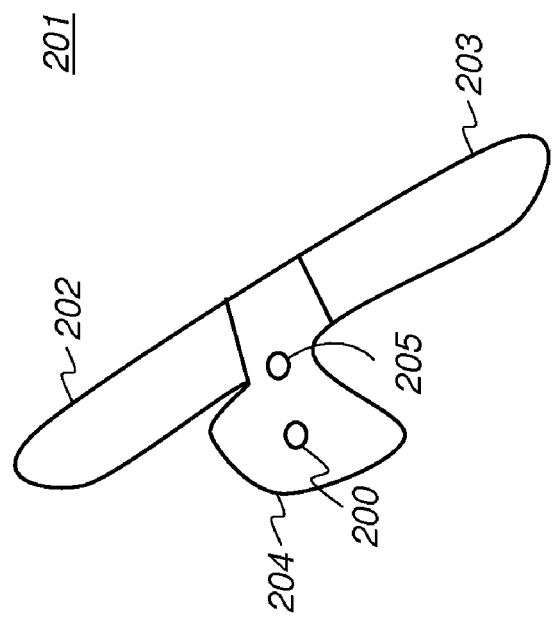
FIG. 2 is a diagram illustrating a segmentation map and a selected point.

FIG. 2 depicts a segmentation map that could result from an automatic segmentation algorithm. The user indicates seed point 200 to the automatic segmentation algorithm that uses this point to classify, or label, the voxel regions within a CT exam. Region 201 is labeled as the parenchyma tissue, or just as background, meaning that any voxel labeled as background is not part of a vessel or lesion. These two segmentation classes may be mutually exclusive. Although there are probably vessels that exist within the region 201, classifying those vessels may not be of interest since none of the vessels directly contacts the lesion. Region 204 is labeled as lesion tissue. However, parts of region 201 are misclassified as lesion tissue and are actually part of a vessel. Regions 202 and 203 are correctly classified as corresponding to vessel tissue.

Figure 4:
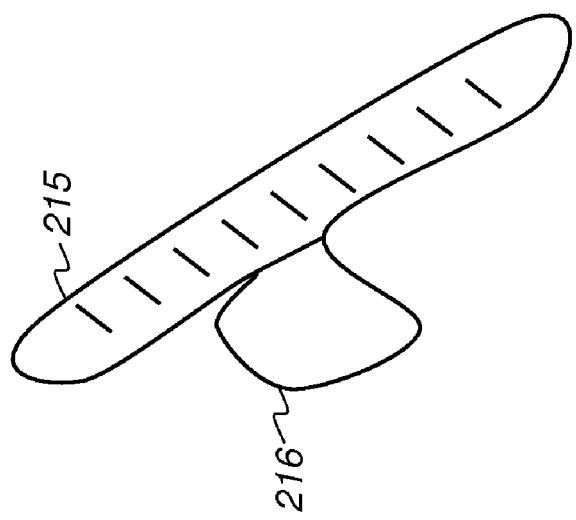
FIG. 4 is a diagram showing the final lesion segmentation map with vessel tissue.

In an exemplary embodiment, the automatic segmentation results may be displayed as colored outlines overlaid on top of the CT slice voxel data. This allows the observer to view directly both the structure of the voxel data and the regions that the automatic segmentation algorithm has identified as lesion and vessel. Tissue regions identified as background are rendered as transparent. The operator of the PACS, usually a radiologist, views the results of the automatic segmentation processing and decides if the segmentation needs alteration. When the operator decides to alter the segmentation map, he or she uses the mouse to make a single click, indicated by edit point 205. The image editing algorithm uses the segmentation map and the designated edit point edit 205 to reclassify region 204 as part lesion region 215 and part vessel region 216 as shown in FIG. 4.

Figure 3:
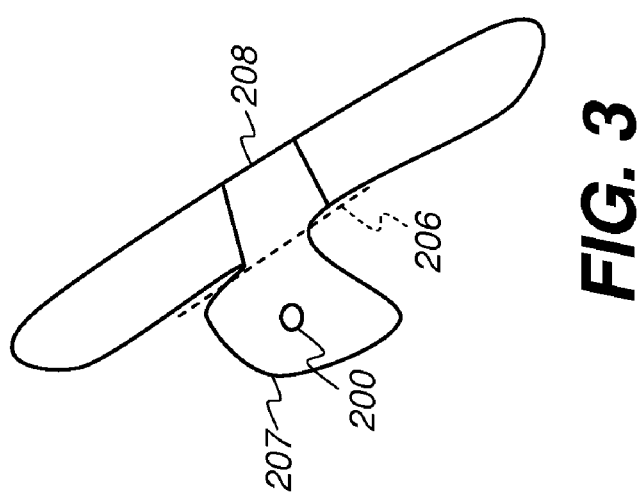
FIG. 3 is a diagram showing the resulting cut line projection and potential lesion and vessel regions.

The image-editing algorithm constructs a cutting plane in 3-dimensional space that includes the edit point 205 shown in FIG. 2. Line 206, shown in FIG. 3, is the projection of that 3-dimensional cutting plane. The cutting plane is used to divide the lesion region 204 (shown in FIG. 2) into two parts; potential lesion region 207 and potential vessel region 208. This division of the original lesion region 204 is performed in a 3-dimensional sense, i.e. the region is divided as a 3-dimensional object. With the original lesion region 204 divided into two parts, a decision must be made as to which of the two parts remains classified as lesion tissue versus some other tissue type. Since region 207 also contains the seed point 204, it becomes the part of lesion region 204 that remains classified as lesion tissue. The other part of region 204 now becomes classified as vessel tissue since this region contacts two vessel regions 202 and 203 (shown in FIG. 2). Reclassified regions resulting from the action of the cutting plane can be classified as chest wall tissue if the region to be reclassified is adjacent with chest wall classified regions.

Figure 5B:
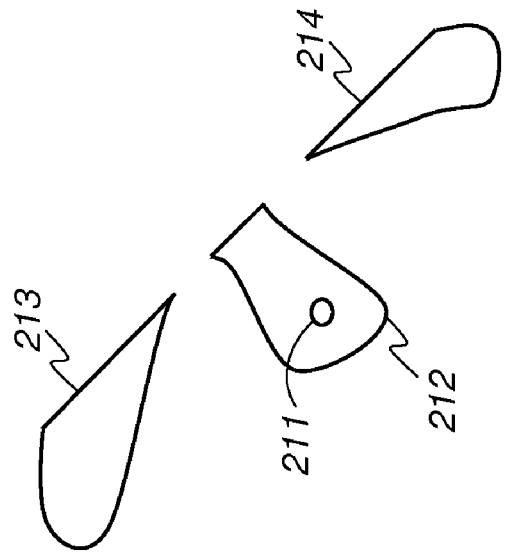
FIG. 5B is a diagram showing fragmented regions.
Figure 5A:
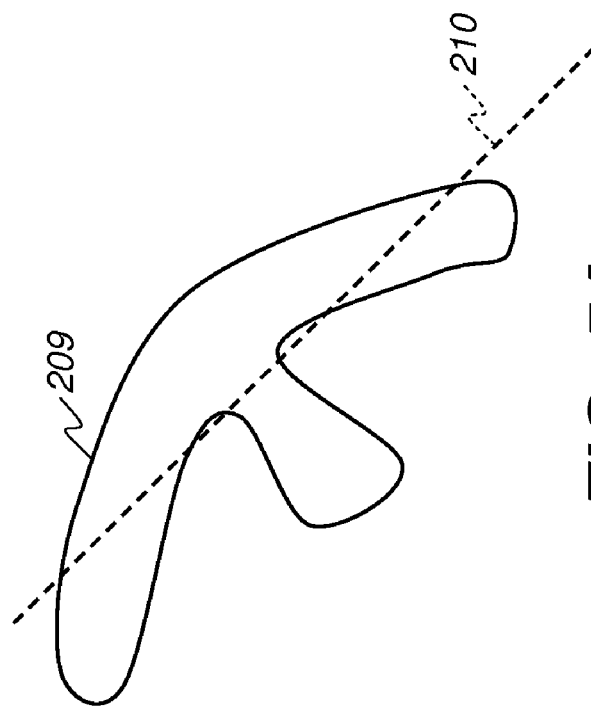
FIG. 5A is a diagram showing regions divided by a cutting plane.

The act of dividing a region into two parts can result in some unexpected fragment regions. FIG. 5A illustrates a typical scenario in which lesion region 209 is divided by a cutting plane shown as projected line 210. As part of the reclassification processing, each voxel in the CT image data set is assigned to be on the same side of the cutting plane as the seed point or on the opposite side. FIG. 5B shows fragment regions 213 and 214 that have been assigned to be on the same side of the plane as seed point 211. Lesion region 212 is obtained by performing a connected component analysis starting with seed point 211. However, since fragment regions 213 and 214 are not connected with seed point 211 they are reclassified as vessel regions.

Referring again to FIG. 2, the operator of the PACS may decide to alter the segmentation map that includes lesion and vessel regions. The operator selects edit point 205 without having to specify the orientation of the resulting cutting plane. A cutting plane algorithm uses the segmentation map and the specified edit point to determine automatically the orientation of the cutting plane. A number of candidate cutting planes are constructed and evaluated. For each candidate cutting plane, the cross sectional area that the cutting plane makes with the segmentation map is calculated. After all candidate cutting planes have been evaluated, the cutting plane with the lowest calculated cross sectional area is selected as the cutting plane to be used. As each candidate cutting plane is evaluated, on the cross sectional area of lesion regions is counted, i.e. cross sectional area of vessel or other tissue type regions does not affect the selection of the cutting plane orientation. Additionally, only the cross sectional area of connected or contiguous regions with the seed point are counted as well. Thus, for the example illustrated in FIG. 5A and FIG. 5B, the fragment regions 213 and 214 would not affect the selection of the cutting plane orientation.

As part of the optimization of the orientation of the cutting plane, the orientation of each candidate-cutting plane is described by an azimuth angle $\theta$, and a clocking angle $\phi$ in a polar coordinate system. The azimuth angle $\theta$ is varied from 0 to $\pi/2$ and the clocking angle f is varied from 0 to $\pi$. For the ring of points located on the equator of the polar coordinate system ($\theta$=90 degrees), $N_o \phi$ angle points (typically 72) are evaluated. The number of points for each corresponding latitude ring, the number of points evaluated diminishes given the relationship:

$$N=N_o \cosine(\theta).$$

This relationship allows for the approximate change in solid angle sampling as a function of the azimuth angle $\theta$.

For a given candidate cutting plane described by $\theta$ and $\phi$, a 2-dimensional grid of points is laid out with the edit point at the center. Voxel values for grid locations are determined by tri-linear interpolation with regard to the segmentation map value.

Embodiments of the present disclosure can also be used with other mathematical methods that minimize the cross sectional area the cutting plane makes with the segmentation map. For example, a Simplex optimization strategy can be used. This method starts with initial values for angles $\theta$ and $\phi$. Then values for q and f are proposed as "good" directions to migrate these angle values based on an evaluation function. For this scenario, the evaluation function is the value of the cross sectional area. The preferred embodiment of the present invention uses the angle sampling approach described above. A problem with the Simplex optimization approach is that the algorithm may identify a local minimum with regard to the cross sectional area. The aforementioned method globally samples possible values for the cutting plane and an approximation of the minimum cross sectional area is guaranteed. If finer control is desired, the results of the global approach can be used as a starting point for an optimization method, as the starting point will be in the neighborhood of the true minimum cross sectional slice.

The operator of a PACS can select the edit point while viewing the segmentation map as a 3-dimensional object as per a single point perspective rendering. The graphical user interface of the diagnostic workstation allows the operator to rotate, translate, and zoom the perspective of segmentation maps. The operator can change the view of the segmentation until a satisfactory view is obtained. This feature of the user interface allows the operator to have confidence in the geometry relationships of the parts of the segmentation map.

Figure 6B:
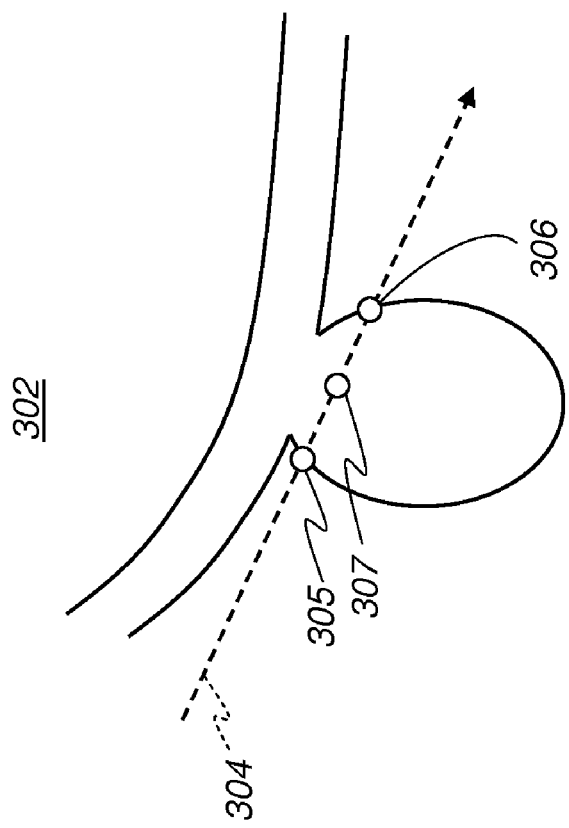
FIG. 6B is a diagram showing a 3-dimensional selection point on the segmentation map.
Figure 6A:
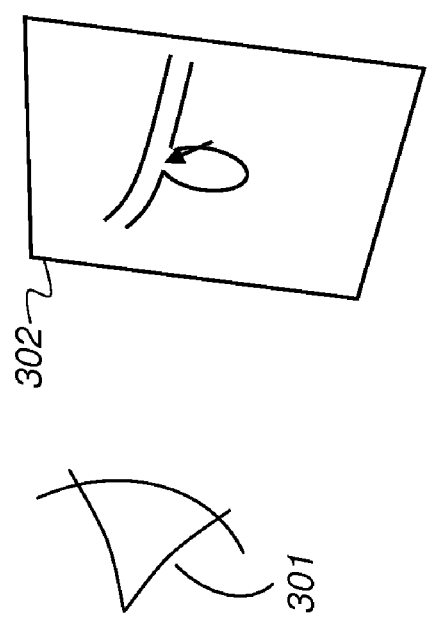
FIG. 6A is a diagram showing an operator viewing a segmentation map on a display.

Referring to FIG. 6A, the operator 301 views a segmentation map on electronic display device 42a (shown in FIG. 1) shown as item 302. Pictorially represented on electronic display device 302 is the cursor position of the mouse which serves as the 2-dimensional edit point. The 2-dimensional selection point is converted into a 3-dimensional edit point using the same single point perspective equations that were used to generate the 3-dimensional view of the segmentation map. The 3-dimensional selection point, shown as point 305 in FIG. 6B, represents the closest point to the observer in the graphics coordinate system wherein the observer is placed at the single point perspective. The ray 304 is constructed along the line-of-sight vector emanating from the single point perspective. Points 305 and 306 represent entrance and exit points with respect to the ray 304. The 3-dimensional edit point 307 is constructed by taking the midpoint between the entrance point 305 and exit point 306.

Embodiments of the present disclosure have advantages relative to prior art methods, in particular, to the method described by Igarashi et al. in the SigGraph 99 article "Teddy: A Sketching Interface for 3D Freeform Design". For example, embodiments of the present disclosure will work with an object having any arbitrary shape. Embodiments of the present disclosure also enable the user to specify the clipping surface or plane with the selection of a single point. The method described by Igarashi et al, on the other hand, requires two points and the object oriented precisely relative to the single point perspective. Embodiments of the present disclosure also enable the user to select the single edit point from either a 2-dimensional or 3-dimensional representation of the object to be edited. In an exemplary embodiment, a graphical user interface presents the operator of the system 2-dimensional slice presentation of the CT voxel data and a 3-dimensional view of the segmented anatomy region of interest. The operator then can choose between the 2-dimensional and 3-dimensional view for the selection of the edit point.

While the present disclosure includes descriptions of various preferred embodiments, it should be understood by those having skill in the art that the descriptions herein are merely exemplary and that various changes may be made and equivalents may be substituted for elements thereof without departing from the scope of the invention. Therefore, it is intended that the invention not be limited to the best mode of carrying out this invention or to the particular embodiments disclosed herein, but that the invention will include all embodiments falling within the scope and spirit of the appended claims.

PARTS LIST 10a image capture device
10b image capture device
42a electronic display device
42b electronic display device
44a input control device
44b input control device
60 mobile computer
110 communications network
120 diagnostic workstation computer
140 image archive computer
150 software application program
200 seed point
201 background region
202 vessel region
203 vessel region
204 lesion region
205 edit point
206 line
207 potential lesion region
208 potential vessel region
209 lesion region
210 line
211 seed point
212 lesion region
213 fragment region
214 fragment region
215 lesion region
216 vessel region
301 operator
302 segmentation map
304 ray
305 point
306 point
307 point

The invention claimed is:

1. A digital image editing method, comprising:
receiving a three-dimensional volume image of an anatomical object of interest, wherein the volume image is characterized by first and second mutually exclusive segmentation classes;
deriving a two-dimensional slice image from the volume image;
selecting a single point on the slice image within the second segmentation class; and
defining a plane in response to the selection of the single point, the plane dividing the second segmentation class into a target portion corresponding to the object and a remainder portion.

2. The method of claim 1, wherein the first segmentation class corresponds to at least one of a parenchyma, a vessel, and a chest wall, and the second segmentation class corresponds to a lesion.

3. The method of claim 1, wherein the target portion corresponds to a lesion, and the remainder portion corresponds to at least one of a parenchyma, a vessel, and a chest wall.

4. The method of claim 1, wherein the single point lies within the plane.

5. The method of claim 1, further including creating a three-dimensional rendering of the target and remainder portions connected at the first plane.

6. The method of claim 5, further including rendering the remainder portion transparent such that only the target portion is displayed in the three-dimensional rendering.

7. The method of claim 1, further including defining an additional plane in response to the selection of the single point, wherein the plane and the additional plane each define a cross section of the object thereon.

8. The method of claim 7, further including calculating a characteristic of each of the defined cross sections, and choosing one of the plane and the additional plane based on the calculated characteristics.

9. The method of claim 8, wherein choosing one of the plane and the additional plane comprises selecting a plane that defines a minimum cross sectional area of a contiguous portion of the object and that passes through the single point.

10. The method of claim 8, wherein the calculated characteristic is an area of the defined cross section.

11. A digital image editing method, comprising:
viewing a two-dimensional slice image of an anatomical object of interest corresponding to a three-dimensional volume image of the object, wherein the volume image is characterized by first and second mutually exclusive segmentation classes;
selecting a single point on the slice image within the second segmentation class;
forming a plurality of planes in response to the selection of the single point, each plane of the plurality of planes passing through the single point and defining a cross section of the object thereon;
calculating a characteristic of each cross section defined by the plurality of planes;
selecting a plane of the plurality of planes based on the calculated characteristics; and
classifying the second segmentation class along the selected plane.

12. The method of claim 11, wherein calculating a characteristic of each cross section comprises calculating an area of a contiguous portion of each cross section defined by the plurality of planes.

13. The method of claim 11, wherein selecting a plane of the plurality of planes comprises selecting a plane defining a minimum cross sectional area of a contiguous portion of the object.

14. The method of claim 11, wherein the first segmentation class corresponds to at least one of a parenchyma, a vessel, and a chest wall, and the second segmentation class corresponds to a lesion.

15. The method of claim 11, further including forming a three-dimensional rendering of the object comprising a target portion and a remainder portion connected by the selected plane.

16. The method of claim 15, further including rendering the remainder portion transparent such that only the target portion is displayed in the three-dimensional rendering.

17. A digital image editing method, comprising:
receiving a three-dimensional volume image of an anatomical object of interest, wherein the volume image is characterized by first and second mutually exclusive segmentation classes;
deriving a three-dimensional view from the volume image;
selecting a single point on the three-dimensional view within the second segmentation class; and
defining a plane in response to the selection of the single point, the plane dividing the second segmentation class into a target portion corresponding to the object and a remainder portion.

18. The method of claim 17, wherein the first segmentation class corresponds to a parenchyma and the second segmentation class corresponds to a lesion connected to one of a vessel and a chest wall.

19. The method of claim 17, further including identifying an additional point on the three-dimensional view, the single point and the additional point both being disposed on the plane.

20. The method of claim 19, wherein the additional point lies along a line of sight vector passing through the single point.

* * * * *